(12) United States Patent
Huang et al.

(10) Patent No.: US 8,971,708 B2
(45) Date of Patent: Mar. 3, 2015

(54) SYSTEM, METHOD AND RELEVANT DEVICE FOR SIGNAL TRANSMISSION

(75) Inventors: Xiaoqing Huang, Beijing (CN); Han Li, Beijing (CN); Lei Wang, Beijing (CN); Dechao Zhang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 670 days.

(21) Appl. No.: 13/256,864

(22) PCT Filed: Mar. 17, 2010

(86) PCT No.: PCT/CN2010/000329
§ 371 (c)(1),
(2), (4) Date: Dec. 15, 2011

(87) PCT Pub. No.: WO2010/105506
PCT Pub. Date: Sep. 23, 2010

(65) Prior Publication Data
US 2012/0106963 A1  May 3, 2012

(30) Foreign Application Priority Data
Mar. 17, 2009 (CN) .......................... 2009 1 0080273

(51) Int. Cl.
*H04J 14/00* (2006.01)
*H04B 10/00* (2013.01)
(Continued)

(52) U.S. Cl.
CPC ......... *H04Q 11/0067* (2013.01); *H04W 88/085* (2013.01)
USPC ............... 398/66; 398/43; 398/115; 398/118; 398/116; 370/449; 370/508; 370/329

(58) Field of Classification Search
CPC ..................... H04B 10/1143; H04B 10/25758; H04B 10/25752; H04J 14/06
USPC .............................................. 398/43, 66, 115
See application file for complete search history.

(56) References Cited

U.S. PATENT DOCUMENTS

| 2004/0067059 A1 | 4/2004 | Song et al. |
| 2004/0096222 A1* | 5/2004 | Cagenius ....................... 398/115 |

(Continued)

FOREIGN PATENT DOCUMENTS

| CN | 149 789 4 | 5/2004 |
| CN | 181 618 1 | 8/2006 |

(Continued)

*Primary Examiner* — Oommen Jacob
(74) *Attorney, Agent, or Firm* — Fay Kaplun & Marcin, LLP

(57) ABSTRACT

A system, a method and a related device for signal transmission are provided in order to improve utilization efficiency of the fiber. The system includes an optical line terminal (OLT), a plurality of optical network units (ONU), a base band unit (BBU), a plurality of remote radio units (RRU), a first signal-processing device and a plurality of second signal-processing devices, wherein the first signal-processing device sends a multiplexed signal to a plurality of second signal-processing devices after a plurality of signals sent by the OLT and the BBU are multiplexed, and demultiplexes a signal sent by the second signal-processing device in order to obtain a plurality of signals sent by the ONU and a plurality of different RRUs and sends these demultiplexed signals to the OLT and the BBU; one of a plurality of second signal processing devices sends a multiplexed signal to the first signal-processing device after a plurality of signals sent by the ONU and a plurality of different RRUs are multiplexed, and demultiplexes a signal sent by the first signal-processing device in order to obtain a signal sent by the OLT and a plurality of signals sent to a plurality of different RRUs by the BBU and sends these demultiplexed signals to the ONU and the RRUs.

18 Claims, 12 Drawing Sheets

(51) Int. Cl.
*H04Q 11/00* (2006.01)
*H04W 88/08* (2009.01)

(56) References Cited

U.S. PATENT DOCUMENTS

2007/0212072 A1    9/2007   Iannone et al.
2012/0106963 A1 *  5/2012   Huang et al. .................... 398/66

FOREIGN PATENT DOCUMENTS

| CN | 192 967 2 | 3/2007 |
| CN | 101 098 206 | 1/2008 |
| CN | 101 166 064 | 4/2008 |
| WO | WO 2008036976 A2 * | 3/2008 |

* cited by examiner

SYSTEM, METHOD AND RELEVANT DEVICE FOR SIGNAL TRANSMISSION

This application is a U.S. National Stage of International Application No. PCT/CN2010/000329, filed on Mar. 17, 2010, designating the United States, and claiming priority to Chinese Patent Application No. 200910080273.0, filed with the Chinese Patent Office on Mar. 17, 2009 and entitled "Signal Transmission System and Relevant Apparatus", both of which are hereby incorporated by reference in their entirety.

FIELD

The present invention relates to the field of optical transmission and particularly to a signal transmission system and method and a relevant apparatus.

BACKGROUND

An existing Passive Optical Network (PON) providing a point-to-multipoint optical fiber access is typically applied in the field of a broadband access to provide a user with communication services of data, e.g., voice, video, etc. Referring to FIG. 1, a typical PON system includes an Optical Line Terminal (OLT), an Optical Network Unit (ONU) and an Optical Distribution Network (ODN). A signal is transmitted between the OLT and the ONU over the optical distribution network including no active device but composed of passive optical devices, e.g., optical fiber, optical splitters, etc. A signal is transmitted through a single bidirectional fiber in the PON system typically with an uplink signal wavelength of 1310 nm and a downlink signal wavelength of 1490 nm for the ONU and an analog video data wavelength of 1550 nm.

A Distributed NodeB is a predominant type of station for a 3G NodeB, and a fundamental principle thereof lies in that respective functional modules of the NodeB are deployed at different physical locations using remote technology and a core module typically includes a Base Band Unit (BBU) and a Remote Radio Unit (RRU). Referring to FIG. 2, the BBU may be connected with a plurality of RRUs to improve the efficiency of sharing a baseband pool. In actual deployment, BBUs may be arranged centrally to conserve a resource of station addresses. This application generally relates to transmission of a baseband signal between the BBU and the RRU, which demands a high bandwidth, low time delay and jitter of time and frequency, thus the BBU and the RRU are connected typically through fiber straight drive.

Since PON is generally adopted for broadband access, the signal is generally transmitted to a metropolitan area network; and transmission between the BBU and the RRU of the distributed NodeB is generally connected through fiber straight drive, thus the baseband signal is terminated between the BBU and the RRU. Since source and destination addresses and transmission requirements between the broadband access and the baseband signal transmission are different, it is difficult to share an optical fiber and a transmission system. In order to improve the efficiency to utilize the optical fiber access devices, it can be considered that the signal transmitted over the Passive Optical Network (PON) and the baseband signal transmitted in the distributed NodeB be transmitted collectively over the same optical fiber access network. However, the purpose of collective transmission can not be achieved due to the presence of the following problems in the prior art:

1. In the existing PON system, a transmission rate 1 Gb/s of an uplink signal is below a total required bandwidth between the BBU and the RRU in the distributed NodeB and thus fails to satisfy the demand for transmission of the baseband signal in the distributed NodeB;

2. The BBU and the RRU are connected through fiber straight drive, and uplink and downlink signals are transmitted through different optical fibers, thus wasting a resource of optical fibers and lacking manageability;

3. Time and frequency synchronization is highly demanded in a TDD system, e.g., TD-SCDMA, etc., and if transmission in the distributed NodeB is performed with the traditional method, then an introduced jitter of time and frequency may grow linearly with the increasing number of the cascaded RRUs, thus making it more difficult to perform time and frequency synchronization; and 4. An available communication bandwidth per RRU on average may drop linearly with the increasing number of the cascaded RRUs; the average available bandwidth may be improved with a transmission system at a high rate, but an investment on transmission devices will be increased greatly.

SUMMARY

An embodiment of the invention provides a signal transmission system to address the problem in the prior art of inefficient utilization of optical fibers because a signal transmitted over a Passive Optical Network (PON) and a baseband signal transmitted in a distributed NodeB can not be transmitted collectively over the same optical fiber access network.

Correspondingly, embodiments of the invention provide a signal transmission method and a relevant apparatus.

The embodiments of the invention provide the following technical solutions.

A signal transmission system includes an Optical Line Terminal, OLT, an Optical Network Unit, ONU, a Base Band Unit, BBU, Remote Radio Units, RRUs, a first signal processing apparatus and a second signal processing apparatus, wherein:

the first signal processing apparatus is configured to multiplex and then transmit to the second signal processing apparatus signals transmitted from the OLT and the BBU and to de-multiplex and then transmit to the OLT and the BBU a signal transmitted from the second signal processing apparatus; and the second signal processing apparatus is configured to multiplex and then transmit to the first signal processing apparatus signals transmitted from the ONU and the RRUs and to de-multiplex and then transmit to the ONU and the RRUs a signal transmitted from the first signal processing apparatus.

A signal processing apparatus includes:

a first reception unit configured to receive a signal transmitted from an Optical Line Terminal, OLT, to an Optical Network Unit, ONU, and signals transmitted from a Base Band Unit, BBU, to different Remote Radio Units, RRUs;

a multiplexing unit configured to multiplex the signals received respectively by the first reception unit; and a first transmission unit configured to transmit a signal resulting from multiplexing by the multiplexing unit.

A signal processing apparatus includes:

a first reception unit configured to receive a signal transmitted from an Optical Network Unit, ONU, to an Optical Line Terminal, OLT, and signals transmitted from different Remote Radio Units, RRUs, to a Base Band Unit, BBU;

a multiplexing unit configured to multiplex the signals received respectively by the first reception unit; and a first transmission unit configured to transmit a signal resulting from multiplexing by the multiplexing unit.

A signal transmission method includes:
multiplexing, by a first signal processing apparatus, signals transmitted from an OLT and a BBU; and
de-multiplexing by a second signal processing apparatus a signal resulting from the multiplexing and transmitting signals resulting from the de-multiplexing to an ONU and RRUs.

A signal transmission method includes:
de-multiplexing by a first signal processing apparatus a signal resulting from multiplexing, which is generated by a second signal processing apparatus multiplexing signals transmitted from an ONU and RRUs; and
transmitting by the first signal processing apparatus signals resulting from the de-multiplexing to an OLT and a BBU.

A signal transmission system includes an Optical Line Terminal, OLT, an Optical Network Unit, ONU, a Base Band Unit, BBU, Remote Radio Unit, RRUs, a first signal processing apparatus, a second signal processing apparatus and at least two filtering apparatuses connected in cascade, wherein there is a terminal in the filtering apparatuses connected in cascade, which is connected with the second signal processing apparatus, the second signal processing apparatus presents a hierarchical relationship with at least one of the filtering apparatuses sequentially in an order that they are connected, and each of the filtering apparatuses is connected with one of the RRUs, and wherein:
the first signal processing apparatus is configured to multiplex and then transmit to the second signal processing apparatus signals transmitted from the OLT and the BBU and to de-multiplex and then transmit to the OLT and the BBU a signal transmitted from the second signal processing apparatus;
the second signal processing apparatus is configured to multiplex and then transmit to the first signal processing apparatus signals transmitted from the ONU and the filtering apparatus connected therewith and to de-multiplex and then transmit to the ONU and the filtering apparatus connected therewith a signal transmitted from the first signal processing apparatus; and
the filtering apparatuses each are configured to split a signal transmitted from an upper level thereof into two branches of signals, to transmit one of the branches of signals resulting from splitting to a lower level thereof, to filter the other branch of signal resulting from splitting to retrieve a signal required for the RRU connected therewith and to transmit the signal retrieved through filtering to the RRU connected therewith; and to couple a signal transmitted from the lower level thereof and a signal transmitted from the RRU connected therewith and to transmit a signal resulting from coupling to the upper level thereof.

A signal processing apparatus includes:
a first reception unit configured to receive a signal transmitted from an Optical Network Unit, ONU, to an Optical Line Terminal, OLT, and a signal transmitted from a filtering apparatus connected therewith;
a multiplexing unit configured to multiplex the signals received respectively by the first reception unit; and
a first transmission unit configured to transmit a signal resulting from multiplexing by the multiplexing unit.

A filtering apparatus includes:
a first reception unit configured to receive a signal transmitted from an upper level of the filtering apparatus;
a splitting unit configured to split the signal received by the first reception unit into two branches of signals;

a first transmission unit configured to transmit one of the branches of signals resulting from splitting by the splitting unit to a lower level of the filtering apparatus;
a filtering unit configured to filter the other branch of signal resulting from splitting by the splitting unit to retrieve a signal required for an RRU connected with the filtering apparatus; and
a second transmission unit configured to transmit the signal retrieved through filtering by the filtering unit to the RRU connected with the filtering apparatus.

A signal transmission method applicable to a system including filtering apparatuses connected in cascade, wherein there is a terminal in the filtering apparatuses, which is connected with a second signal processing apparatus, the second signal processing apparatus presents a hierarchical relationship with at least one of the filtering apparatuses sequentially in an order that they are connected, and each of the filtering apparatuses is connected with an RRU, and
the method includes:
multiplexing, by a first signal processing apparatus, signals transmitted from an OLT and a BBU;
de-multiplexing and then transmitting by the second signal processing apparatus to an ONU and the filtering apparatus connected therewith a signal resulting from multiplexing; and
splitting by the filtering apparatus a signal transmitted from an upper level thereof into two branches of signals, transmitting one of the branches of signals resulting from splitting to a lower level thereof, filtering the other branch of signal resulting from splitting to retrieve a signal required for the RRU connected therewith and transmitting the signal retrieved through filtering to the RRU connected therewith.

A signal transmission method applicable to a system including filtering apparatuses connected in cascade, wherein:
there is a terminal in the filtering apparatuses, which is connected with a second signal processing apparatus, the second signal processing apparatus presents a hierarchical relationship with at least one of the filtering apparatuses sequentially in an order that they are connected, and each of the filtering apparatuses is connected with an RRU, and
the method includes:
coupling by each of the filtering apparatuses a signal transmitted from a lower level thereof and a signal transmitted from the RRU connected therewith and transmitting a signal resulting from coupling to an upper level thereof;
multiplexing by the second signal processing apparatus a signal transmitted from an ONU and a signal transmitted from the filtering apparatus connected therewith; and
de-multiplexing and then transmitting by a first signal processing apparatus to an OLT and a BBU a signal resulting from the multiplexing.

A signal transmission system including an Optical Line Terminal, OLT, an Optical Network Unit, ONU, a Base Band Unit, BBU, Remote Radio Units, RRUs, a first signal processing apparatus, a second signal processing apparatus and at least two filtering apparatuses connected in cascade, wherein there is a terminal in the filtering apparatuses connected in cascade, which is connected with the second signal processing apparatus, the second signal processing apparatus presents a hierarchical relationship with at least one of the filtering apparatuses sequentially in an order that they are connected, and each of the filtering apparatuses is connected with one of the RRUs, wherein:
the first signal processing apparatus is configured to multiplex and then transmit to the second signal processing apparatus signals transmitted from the OLT and the BBU and to de-multiplex and then transmit to the OLT and the BBU a signal transmitted from the second signal processing apparatus;

the second signal processing apparatus is configured to multiplex and then transmit to the first signal processing apparatus signals transmitted from the ONU and the filtering apparatus connected therewith and to de-multiplex and then transmit to the ONU and the filtering apparatus connected therewith a signal transmitted from the first signal processing apparatus;

the filtering apparatus at another level than the last level in cascade is configured to split a signal transmitted from an upper level thereof into two branches of signals, to transmit one of the branches of signals resulting from splitting to a lower level thereof, to filter the other branch of signal resulting from splitting to retrieve a signal required for the RRU connected therewith, to transmit the signal retrieved through filtering to the RRU connected therewith, to couple a signal transmitted from the lower level thereof and a signal transmitted from the RRU connected therewith and to transmit a signal resulting from coupling to the upper level thereof; and the filtering apparatus at the last level in cascade is configured to filter a signal transmitted from an upper level thereof to retrieve a signal required for the RRU connected therewith and to transmit the signal retrieved through filtering to the RRU connected therewith and a signal transmitted from the RRU connected therewith to the upper level thereof.

A filtering apparatus includes:

a first reception unit configured to receive a signal transmitted from an upper level of the filtering apparatus;

a filtering unit configured to filter the received signal to retrieve a signal required for an RRU connected with the filtering apparatus; and a first transmission unit configured to transmit the signal retrieved through filtering by the filtering unit to the RRU connected with the filtering apparatus.

A signal transmission method applicable to a system including filtering apparatuses connected in cascade, wherein there is a terminal in the filtering apparatuses, which is connected with a second signal processing apparatus, the second signal processing apparatus presents a hierarchical relationship with at least one of the filtering apparatuses sequentially in an order that they are connected, and each of the filtering apparatuses is connected with an RRU, and the method includes:

multiplexing, by a first signal processing apparatus, signals transmitted from an OLT and a BBU;

de-multiplexing and then transmitting by the second signal processing apparatus to an ONU and the filtering apparatus connected therewith a signal resulting from multiplexing;

splitting by the filtering apparatus at another level than the last level in cascade a signal transmitted from an upper level thereof into two branches of signals, transmitting one of the branches of signals resulting from splitting to a lower level thereof, filtering the other branch of signal resulting from splitting to retrieve a signal required for the RRU connected therewith and transmitting the signal retrieved through filtering to the RRU connected therewith; and filtering by the filtering apparatus at the last level in cascade a signal transmitted from an upper level thereof to retrieve a signal required for the RRU connected therewith and transmitting the signal retrieved through filtering to the RRU connected therewith.

A signal transmission method applicable to a system including filtering apparatuses connected in cascade, wherein there is a terminal in the filtering apparatuses, which is connected with a second signal processing apparatus, the second signal processing apparatus presents a hierarchical relationship with at least one of the filtering apparatuses sequentially in an order that they are connected, and each of the filtering apparatuses is connected with an RRU, and the method includes:

transmitting by the filtering apparatus at the last level in cascade a signal transmitted from the RRU connected therewith, to an upper level thereof;

coupling by the filtering apparatus at another level than the last level in cascade a signal transmitted from a lower level thereof and a signal transmitted from the RRU connected therewith and transmitting a signal resulting from coupling to an upper level thereof;

multiplexing by the second signal processing apparatus a signal transmitted from an ONU and a signal transmitted from the filtering apparatus connected therewith; and de-multiplexing and then transmitting by a first signal processing apparatus to an OLT and a BBU a signal resulting from multiplexing.

According to the embodiments of the invention, a signal processing apparatus is added so that a signal to be transmitted between an OLT and ONU in a PON system and a baseband signal to be transmitted between a BBU and an RRU in a distributed NodeB system can be borne over the same optical fiber access network for transmission to thereby improve the efficiency of utilizing the optical fiber, lower the cost of a resource of lines required to deploy the PON system and the distributed NodeB system, transmit uplink and downlink signals of the RRU through the single bidirectional optical fiber and address the problem of an influence upon temporal synchronization and an available bandwidth when RRUs are cascaded.

DETAILED DESCRIPTION

The existing PON system and distributed NodeB can not share the optical fiber access network and devices, thus suffering from the problem of inefficient utilization of optical fibers, a signal multiplexing/de-multiplexing apparatus is added according to the embodiments of the invention so that a signal to be transmitted between an OLT and an ONU in a PON system and a baseband signal to be transmitted between a BBU and an RRU in a distributed NodeB system can be borne over the same optical fiber access network to thereby improve the efficiency of utilizing the optical fiber and lower the cost of a resource of lines required to deploy the PON system and the distributed NodeB system.

A general principle of embodying the inventive method will be set forth and described in details hereinafter in connection with two embodiments following the foregoing principle of the invention.

The First Embodiment

Figure 1:
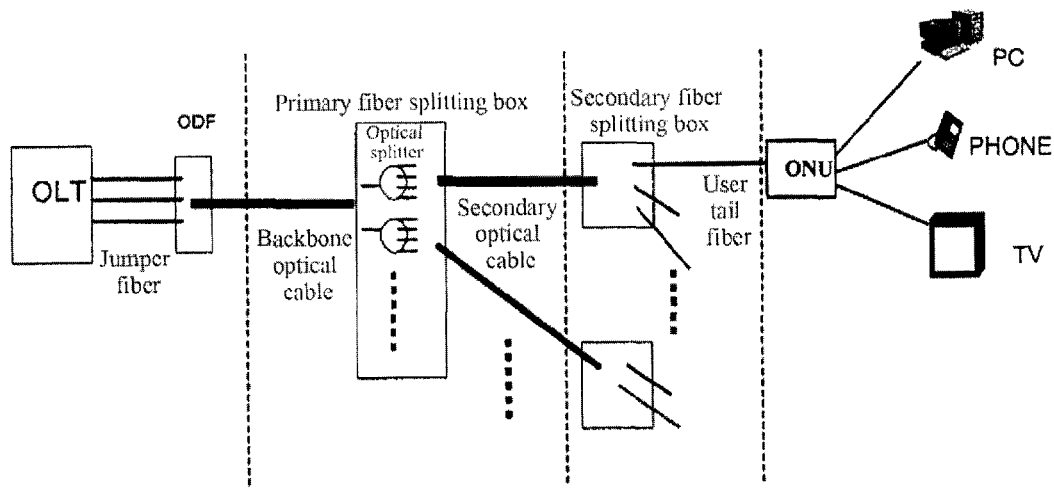
FIG. 1 is a schematic diagram of a PON network system in the prior art.
Figure 2:
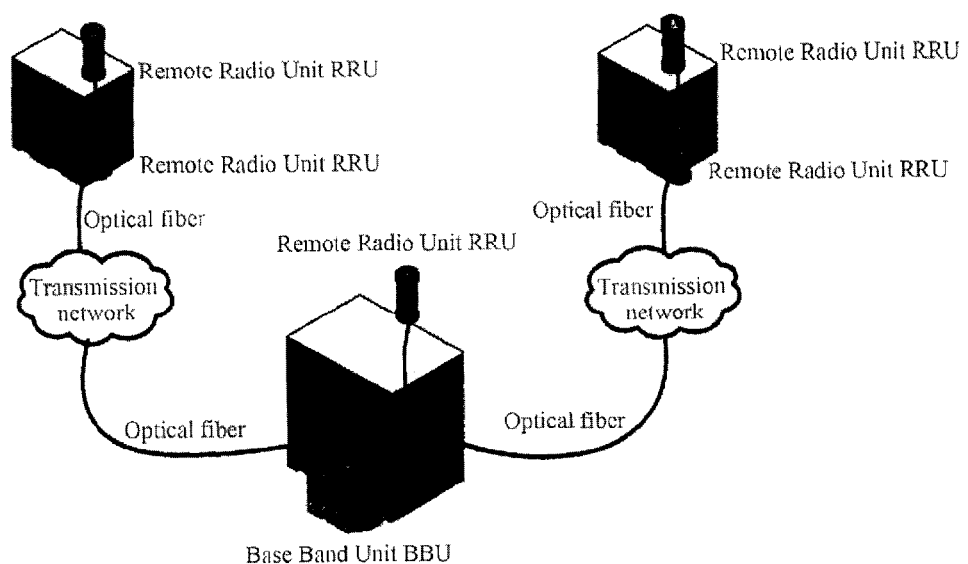
FIG. 2 is a schematic diagram of a distributed NodeB system in the prior art.
Figure 3A:
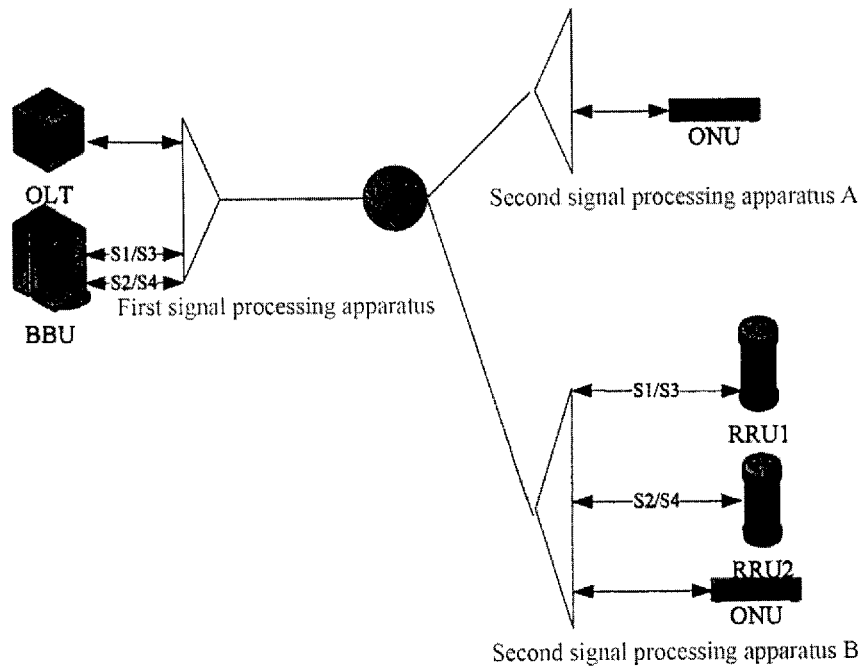
FIG. 3a is a schematic diagram of the first signal transmission system according to an embodiment of the invention.

Referring to FIG. 3a illustrating a schematic diagram of a signal transmission system according to a first embodiment of the invention, the first signal processing apparatus and the second signal processing apparatus will be described in details below by introducing a signal transmission process.

As can be apparent from FIG. 3a, the first signal processing apparatus and the second signal processing apparatus are arranged in the PON system and the distributed NodeB system, where the first processing apparatus generally functions on one hand to multiplex and then transmit to the second processing apparatus signals transmitted from an OLT and a BBU and on the other hand to de-multiplex and then transmit to the OLT and the BBU a signal transmitted from the second processing apparatus, and also the second processing apparatus generally functions on one hand to multiplex and then transmit to the first processing apparatus signals transmitted from an ONU and an RRU and on the other hand to de-multiplex and then transmit to the ONU and the RRU a signal transmitted from the first processing apparatus.

Specifically, the first signal processing apparatus and the second signal processing apparatus transmit a signal in the following process.

The first signal processing apparatus receives a downlink signal at the wavelength of 1490 nm or a video signal at the wavelength of 1550 nm transmitted from the OLT to the ONU and a downlink baseband signal S1 at another wavelength than the wavelength of 1490 nm or 1550 nm to the RRU1 and a downlink baseband signal S2 at another wavelength than the wavelength of 1490 nm or 1550 nm to the RRU2 transmitted from the BBU, multiplexes the received signals and transmits a signal resulting from multiplexing to the second processing apparatus A and the second signal processing apparatus B through an optical fiber;

Upon reception of the signal transmitted from the first signal processing apparatus, the second signal processing apparatus A de-multiplexes the received signal to retrieve from the received signal the signal transmitted from the OLT to the ONU and transmits the signal retrieved through de-multiplexing to the Optical Network Unit (ONU); and upon reception of the signals transmitted from the first signal processing apparatus, the second signal processing apparatus B de-multiplexes the received signal to retrieve the signal transmitted from the OLT to the ONU and the signal S1 to the RRU1 and the signal S2 to the RRU2 respectively transmitted from the BBU and transmits the signal transmitted from the OLT to the ONU to the Optical Network Unit (ONU), the S1 to the RRU1 and the S2 to the RRU2;

Furthermore, the second signal processing apparatus A further receives an uplink signal at the wavelength of 1310 nm transmitted from the ONU and transmits the uplink signal to the first signal processing apparatus;

The second signal processing apparatus B further receives an uplink signal at the wavelength of 1310 nm transmitted from the ONU, an uplink baseband signal S3 at another wavelength than 1310 nm transmitted from the RRU1 to the BBU and an uplink baseband signal S4 at another wavelength than 1310 nm transmitted from the RRU2 to the BBU, multiplexes the signals transmitted from the ONU and the RRUs and transmits the multiplexed uplink signals to the first signal processing apparatus through the optical fiber;

The first signal processing apparatus de-multiplexes the received uplink signals transmitted from the second signal processing apparatus A and the second signal processing apparatus B to retrieve the signal transmitted from the ONU to the OLT, the signal S3 transmitted from the RRU1 to the BBU and the signal S4 transmitted from the RRU2 to the BBU and transmits the signal transmitted from the ONU to the OLT, which is retrieved through de-multiplexing, to the OLT and the signals S3 and S4 retrieved through de-multiplexing to the BBU.

In the implementation process, the signal S1 transmitted from the BBU to the RRU1 and the signal S2 transmitted from the BBU to the RRU2 are signals at different required wavelengths (i.e., colored light is output from the BBU) or signals at adjustable wavelengths; or white light is output from the BBU and then converted by a wavelength converter into signals at different required wavelengths.

Figure 3B:
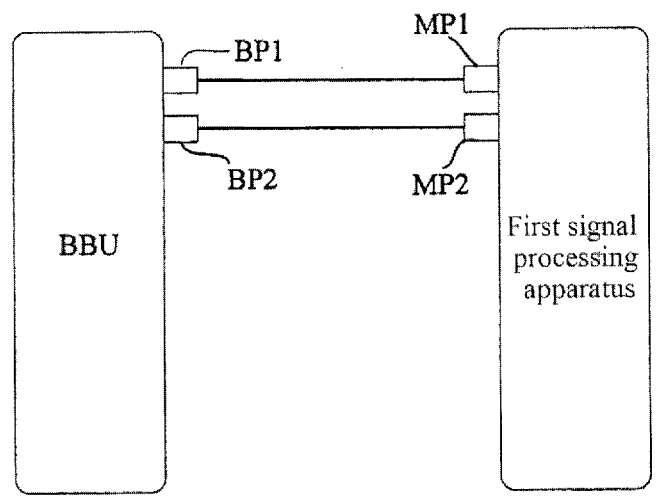
FIG. 3b is a schematic diagram of a way that the BBU and the first signal processing apparatus are connected according to an embodiment of the invention.

Referring to FIG. 3b, when the downlink signal S1 transmitted from the BBU to the RRU1 and the uplink signal S3 transmitted from the RRU1 to the BBU are transmitted at different wavelengths, a port BP1 in the BBU via which the downlink signal S1 is transmitted to the RRU1 is connected with a port MP1 in the first signal processing apparatus via which the downlink signal transmitted from the BBU to the RRU1 is received, and a port BP2 in the BBU via which the uplink signal S3 transmitted from the RRU1 is received is connected with a port MP2 in the first signal processing apparatus via which the uplink signal S3 transmitted from the RRU1 to the BBU, which is retrieved through de-multiplexing, is transmitted to the BBU.

Figure 3C:
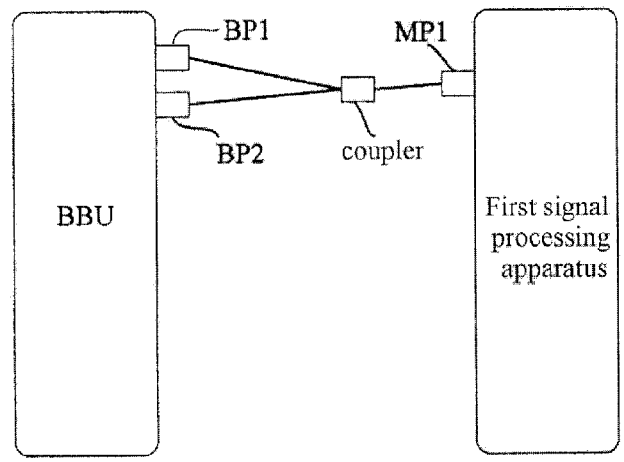
FIG. 3c is a schematic diagram of another way that the BBU and the first signal processing apparatus are connected according to an embodiment of the invention.

Referring to FIG. 3c, when the downlink signal S1 transmitted from the BBU to the RRU1 and the uplink signal S3 transmitted from the RRU1 to the BBU are transmitted at the same wavelengths, the port BP1 in the BBU via which the downlink signal is transmitted to the RRU1 and the port BP2 therein via which the uplink signal transmitted from the RRU1 is received are connected with an input of a coupler, and further an output of the coupler is connected with the port MP1 in the first signal processing apparatus via which the downlink signal transmitted from the BBU to the RRU1 is received and via which the uplink signal S3 transmitted from the RRU1 to the BBU, which is retrieved through de-multiplexing, is transmitted to the BBU.

Particularly in the foregoing signal transmission process, the first signal processing apparatus and the second signal processing apparatus can perform a multiplexing/de-multiplexing process in a multiplexing/de-multiplexing method, e.g., Wavelength Division Multiplexing (WDM), etc. Both the first signal processing apparatus and the second signal processing apparatus are capable of multiplexing/de-multiplexing which can be performed by a device with a similar function, and a signal is transmitted or received between the first signal processing apparatus and the second signal processing apparatus through a single bidirectional optical fiber.

Figure 3D:
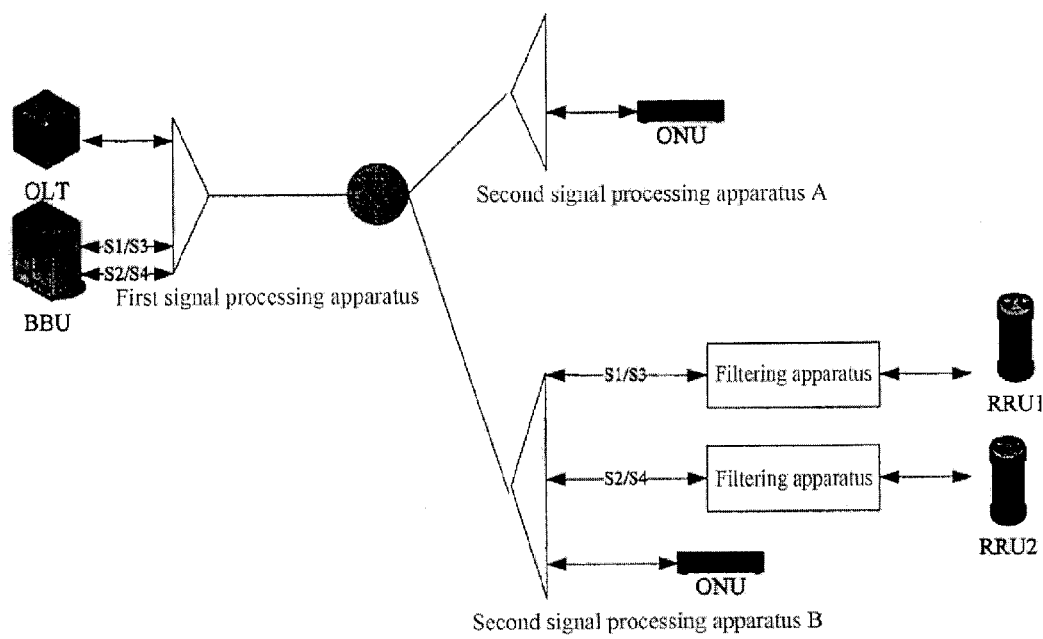
FIG. 3d is a schematic diagram of the first signal transmission system according to an embodiment of the invention.

Referring to FIG. 3d, at least one filtering apparatus may further be included in the system of this embodiment, and for each filtering apparatus, it is provided with one terminal connected with the second signal processing apparatus and the other terminal connected with an RRU and configured to transmit a signal transmitted from the second signal processing apparatus to the RRU connected therewith to the RRU and the signal transmitted from the RRU connected therewith to the second signal processing apparatus.

The Second Embodiment

Figure 4:
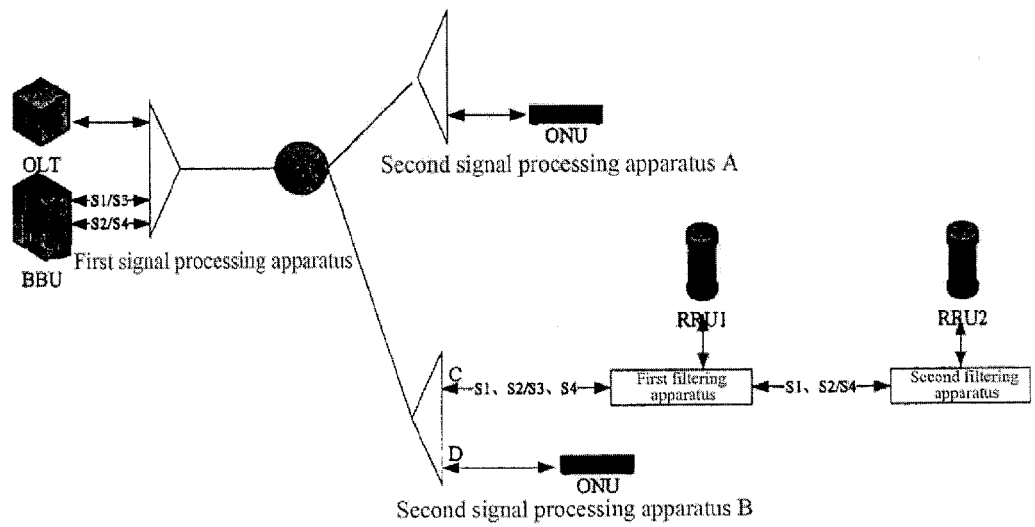
FIG. 4 is a schematic diagram of the second signal transmission system according to an embodiment of the invention.

Referring to FIG. 4 illustrating a schematic diagram of a signal transmission system according to a second embodiment of the invention, and the first signal processing apparatus and the second signal processing apparatus will be described in details below by introducing a signal transmission process.

As can be apparent from FIG. 4, in the signal transmission system, there is a terminal of filtering apparatuses connected in cascade, which is connected with a second signal processing apparatus, the second signal processing apparatus presents a hierarchical relationship with at least one filtering apparatus sequentially in an order that they are connected, and each of the filtering apparatuses is connected with an RRU. Particularly, the first signal processing apparatus generally functions on one hand to multiplex and then transmit to the second signal processing apparatus signals transmitted from an OLT and a BBU and on the other hand to de-multiplex and then transmit to the OLT and the BBU a signal transmitted from the second signal processing apparatus, and also the second signal processing apparatus generally functions on one hand to multiplex and then transmit to the first signal processing apparatus signals transmitted from an ONU and the filtering apparatus connected therewith and on the other hand to de-multiplex and then transmit to the ONU and the filtering apparatus connected therewith a signal transmitted from the first signal processing apparatus. The filtering apparatus splits a signal transmitted from the upper level thereof into two branches of signals, transmits one of the branches of signals resulting from splitting to the lower level thereof, filters the other branch of signal resulting from splitting to retrieve a signal required for the RRU connected therewith and transmits the signal retrieved through filtering to the RRU connected therewith; and couples a signal transmitted from the lower level thereof and a signal transmitted from the RRU connected therewith, and transmits a signal resulting from coupling to the upper level thereof.

The present embodiment will be described below respectively taking a flow of processing a downlink signal and that of processing an uplink signal as an example.

In the flow of processing a downlink signal:

The first signal processing apparatus receives a downlink signal at the wavelength of 1490 nm or a video signal at the wavelength of 1550 nm transmitted from the OLT to the ONU and a downlink baseband signal S1 at another wavelength than the wavelength of 1490 nm or 1550 nm to the RRU1 and a downlink baseband signal S2 at another wavelength than the wavelength of 1490 nm or 1550 nm to the RRU2 transmitted from the BBU, multiplexes the received signals and transmits a signal resulting from multiplexing to the second signal processing apparatus through an optical fiber;

A processing flow of the second signal processing apparatus A is similar to that of the second signal processing apparatus A in the first embodiment and a repeated description thereof will be omitted here.

Upon reception of a signal transmitted from the first signal processing apparatus, the second signal processing apparatus B de-multiplexes the received signal to retrieve the signal transmitted from the OLT to the ONU and the signals transmitted from the BBU to the respective RRUs, that is, retrieves through de-multiplexing the signal of the PON system (at the wavelength of 1490 nm or 1550 nm) and the signals of the distributed NodeB system (at the other wavelengths than 1490 nm or 1550 nm) separately, and transmits a wave of the signal of the PON system retrieved through de-multiplexing via an output port D and waves of the signals used for the distributed NodeB system at the other wavelengths than 1490 nm and 1550 nm via another output port C;

The second signal processing apparatus B transmits a wave of the signal of the PON system retrieved through de-multiplexing to the Optical network Unit ONU via a port D and the waves of the signals used for the distributed NodeB system at the other wavelengths than 1490 nm or 1550 nm to the first filtering apparatus via the port C;

The first filtering apparatus splits the input signals into two branches of signals, filters one of the branches of signals to retrieve the signal required for the RRU1 connected therewith at the predetermined wavelength of the signal required for the RRU1, where the RRU1 is an RRU to be cascaded, and transmits the other branch of signal resulting from splitting to the second filtering apparatus, and the second filtering apparatus filters the signal transmitted from the first filtering apparatus to retrieve the signal required for the RRU2 connected therewith at the predetermined wavelength of the signal required for the RRU2

In the flow of processing an uplink signal:

The second filtering apparatus transmits to the first filtering apparatus a received uplink baseband signal S4 transmitted from the RRU2 to the BBU, and the first filtering apparatus couples the received uplink baseband signal S4 of the RRU2 transmitted from the second filtering apparatus and an uplink baseband signal S3 transmitted from the RRU1 connected therewith to the BBU and transmits a signal resulting from coupling to the second signal processing apparatus B;

The second signal processing apparatus B multiplexes the signal transmitted from the first filtering apparatus and an uplink signal transmitted from the ONU and transmits a signal resulting from multiplexing to the first signal processing apparatus, and the first signal processing apparatus de-multiplexes the signal transmitted from the second signal processing apparatus to retrieve from the signal transmitted from the second signal processing apparatus the signal transmitted from the ONU to the OLT and the signals transmitted from the respective RRUs to the BBU and transmits the signal transmitted from the ONU to the OLT, which is retrieved through de-multiplexing, to the OLT, and the signals transmitted from the respective RRUs to the BBU, which is retrieved through de-multiplexing, to the BBU.

The principle on which a plurality of cascaded filtering apparatuses operate has been described in the second embodiment of the invention taking two filtering apparatuses connected in cascade as an example, and the first filtering apparatus is structurally similar to the second filtering apparatus, where the second filtering apparatus is at the upper level and the second filtering apparatus is at the lower level of the first filtering apparatus, and the first filtering apparatus is at the upper level of the second filtering apparatus.

For the filtering apparatus at another level than the last level and the filtering apparatus at the last level in the system, the signal transmission system according to the second embodiment includes:

an OLT, an ONU, a BBU, RRUs, a first signal processing apparatus, a second signal processing apparatus, and at least two filtering apparatuses connected in cascade, where the first signal processing apparatus is configured to multiplex and then transmit to the second signal processing apparatus signals transmitted from the OLT and the BBU and to de-multiplex and then transmit a signal transmitted from the second signal processing apparatus to the OLT and the BBU; the second signal processing apparatus is configured to multiplex and then transmit to the first signal processing apparatus signals transmitted from the ONU and the filtering apparatus connected therewith and to de-multiplex and then transmit to the ONU and the filtering apparatus connected therewith a signal transmitted from the first signal processing apparatus; the filtering apparatus at another level than the last level in cascade is configured to split a signal transmitted from the upper level thereof into two branches of signals, to transmit one of the branches of signals resulting from splitting to the lower level thereof, to filter the other branch of signal resulting from splitting to retrieve a signal required for the RRU connected therewith, to transmit the signal retrieved through filtering to the RRU connected therewith, to couple a signal transmitted from the lower level thereof and a signal transmitted from the RRU connected therewith and to transmit a signal resulting from coupling to the upper level thereof; and the filtering apparatus at the last level in cascade is configured to filter a signal transmitted from the upper level thereof to retrieve a signal required for the RRU connected therewith and to transmit the signal retrieved through filtering to the RRU connected therewith and a signal transmitted from the RRU connected therewith to the upper level thereof.

The filtering apparatus at another level than the last level in cascade refers to a filtering apparatus with which another filtering apparatus at the lower level thereof is connected, and the filtering apparatus at the last level in cascade refers to a filtering apparatus with which no other filtering apparatus at the lower level thereof is connected. In the structure of the system illustrated in FIG. 4, the first filtering apparatus is the filtering apparatus at another level than the last level in cascade, and the second filtering apparatus is the filtering apparatus at the last level in cascade.

In the present embodiment, the first signal processing apparatus and the second signal processing apparatus may perform a multiplexing or de-multiplexing process on a signal through wave division multiplexing, e.g., Dense Wavelength Division Multiplexing (DWDM) or Coarse Wavelength Division Multiplexing (CWDM) respectively.

Preferably in the present embodiment, the first signal processing apparatus may multiplex the signal transmitted from the OLT to the ONU and the signals transmitted respectively from the BBU to the different RRUs and de-multiplex the signal resulting from multiplexing, which is transmitted from the second signal processing apparatus, through dense wavelength division multiplexing, and the second signal processing apparatus may multiplex the signal transmitted from the ONU to the OLT and the signals transmitted from the different RRUs to the BBU and de-multiplex the signal resulting from multiplexing, which is transmitted from the first signal processing apparatus, through Coarse Wavelength Division Multiplexing (CWDM). With such multiplexing/de-multiplexing, there is a consistent offset index, e.g., jitter of phase and time, etc., of the signal available to each of the RRUs cascaded in hierarchy through the filtering apparatuses, and it is sufficient to perform an optic-electric conversion process in the respective RRUs. In contract, when a plurality of RRUs are connected in cascade as in the prior art, each of the RRUs performs optic-electric-optic conversion and electric processing on an optical signal and then further transmits it to the next cascaded RRU, and this process is a predominant factor of introducing jitter of phase and time. Consequently, jitter of phase and time of a signal received at an RRU will grow with the increasing number of the cascaded RRUs. With the solution according to the embodiment of the invention, the optical signal is processed only through the filtering apparatus at each of the RRUs without any offset of jitter of phase and time, and there is a consistent offset index, e.g., jitter of phase and time, etc., of the respective RRUs, thereby addressing the problem in the prior art that jitter of phase and time of a signal received at an RRU will grow with the increasing number of the cascaded RRUs.

The filtering apparatus may be an Optical Wavelength Division Multiplexer (OADM).

Furthermore in the foregoing two embodiments, an additional optical signal amplification device, e.g., an Erbium Doped Fiber Amplifier (EDFA), etc., can be arranged at the BBU adjacent to the first signal processing apparatus and at the OLT adjacent to the first signal processing apparatus to perform an amplification process on the signal transmitted from the BBU or the signal transmitted from the OLT in order to accommodate required power of the signal.

The second signal processing apparatus may be provided with both the function of the second signal processing apparatus in the first embodiment and that in the second embodiment, that is, de-multiplex the signal resulting from multiplexing, which is transmitted from the first signal processing apparatus, to retrieve the signal required for the non-cascaded RRU connected directly therewith and to retrieve through coarse wavelength division multiplexing the signal required for the cascaded RRU, transmit the signals required for the respective RRUs, which are retrieved through de-multiplexing, to the RRUs through the filtering apparatus connected therewith, de-multiplex the signal resulting from multiplexing to retrieve the signal required for the ONU and also multiplex and transmit to the first signal processing apparatus the signals transmitted from the filtering apparatus, the RRU connected directly therewith and the ONU.

A signal processing apparatus capable of signal multiplexing and de-multiplexing is added in the embodiments of the invention so that a signal to be transmitted between an OLT and ONU in a PON system and a baseband signal to be transmitted between a BBU and an RRU in a distributed NodeB system can be borne over the same optical fiber access network for transmission to thereby improve the efficiency of utilizing the optical fiber, lower the cost of a resource of lines required to deploy the PON system and the distributed NodeB system and address the problem in the prior art of wasting a resource of optical fibers because the BBU and the RRU are connected through fiber straight drive. The embodiments of the invention further provide a filtering apparatus which can be used in combination with the signal processing apparatus according to the invention to alleviate effectively an offset of jitter of phase and time when a plurality of RRUs are cascaded so that an offset index of jitter of phase and time between a signal available to each of the RRUs and those available to the other RRUs will be consistent and a bandwidth of each of the RRUs will not depend upon the number of the cascaded RRUs, thereby improving the quality of transmitting a signal. Furthermore, a signal is transmitted between signal multiplexing and de-multiplexing apparatuses through a single bidirectional optical fiber, thus conserving an optical fiber as compared to two optical fibers respectively required for transmission of uplink and downlink signals between the BBU and the RRU in the prior art.

Figure 5:
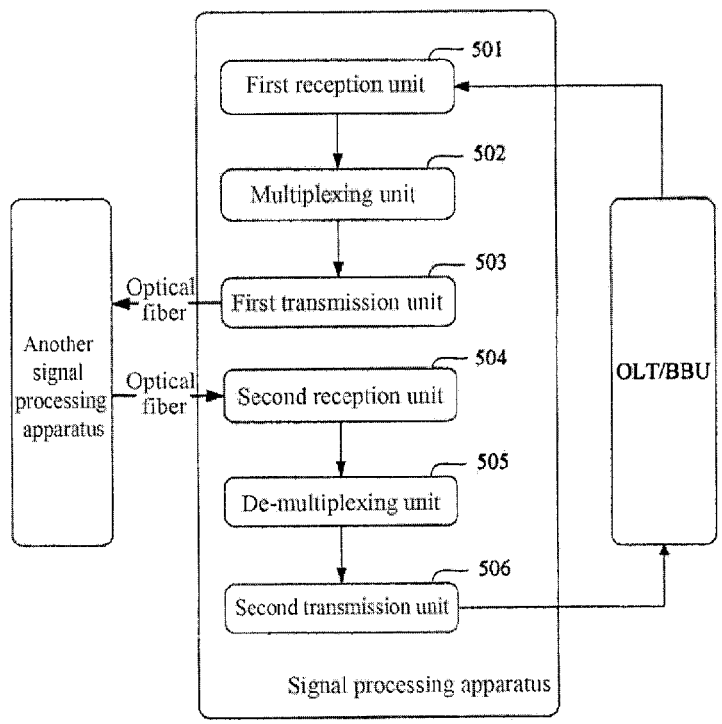
FIG. 5 is a schematic diagram of the structure of the first signal processing apparatus according to an embodiment of the invention.

Correspondingly, an embodiment of the invention further provides a signal processing apparatus, and referring to FIG. 5, this apparatus includes a first reception unit 501, a multiplexing unit 502 and a first transmission unit 503, where:

the first reception unit 501 is configured to receive a signal transmitted from an Optical Line Terminal (OLT) to an Optical Network Unit (ONU) and signals transmitted from a Base Band Unit (BBU) to different Remote Radio Units (RRUs);

the multiplexing unit 502 is configured to multiplex the signals received respectively by the first reception unit 501; and the first transmission unit 503 is configured to transmit a signal resulting from multiplexing by the multiplexing unit 502 over an Optical Distribution Network (ODN).

The signal processing apparatus according to the present embodiment further includes a second reception unit 504, a de-multiplexing unit 505 and a second transmission unit 506, where:

the second reception unit 504 is configured to receive a signal resulting from multiplexing, which is transmitted over the ODN;

the de-multiplexing unit 505 is configured to de-multiplex the signal received by the second reception unit 504 to retrieve a signal transmitted from the ONU to the OLT and signals transmitted from the different RRUs to the BBU; and the second transmission unit 506 is configured to transmit the signal which is retrieved by the de-multiplexing unit 505 through de-multiplexing, which is transmitted from the ONU to the OLT, to the OLT, and the signals retrieved through de-multiplexing, which are transmitted from the different RRUs to the BBU, to the BBU.

Figure 6:
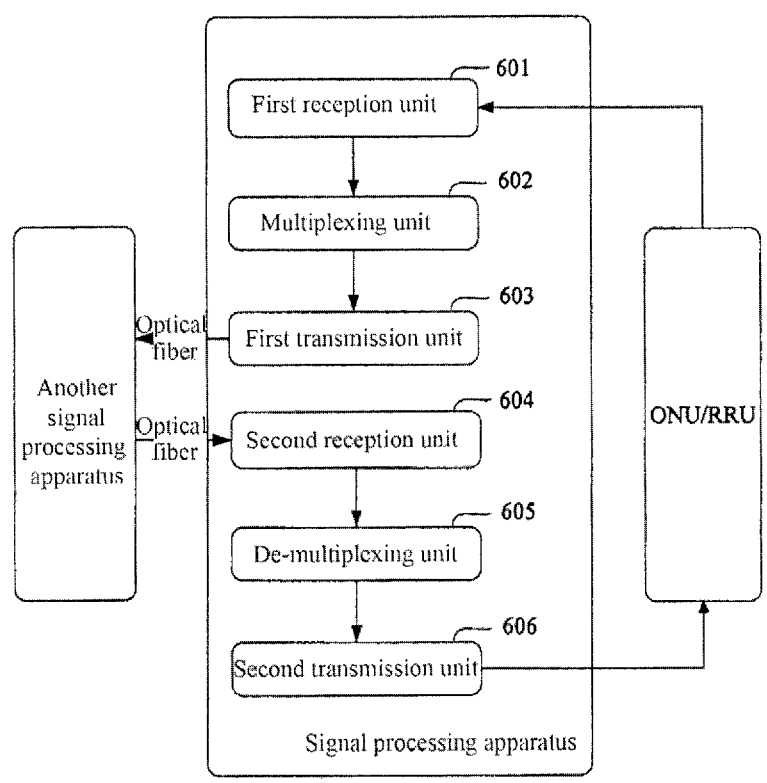
FIG. 6 is a schematic diagram of the structure of the second signal processing apparatus according to an embodiment of the invention.

Referring to FIG. 6, an embodiment of the invention further provides another signal processing apparatus including a first reception unit 601, a multiplexing unit 602 and a first transmission unit 603, where:

the first reception unit 601 is configured to receive a signal transmitted from an Optical Network Unit (ONU) to an Optical Line Terminal (OLT) and signals transmitted from different Remote Radio Units (RRUs) to a Base Band Unit (BBU);

the multiplexing unit 602 is configured to multiplex the signals received respectively by the first reception unit 601; and the first transmission unit 603 is configured to transmit a signal resulting from multiplexing by the multiplexing unit 602 over an ODN.

The signal processing apparatus according to the present embodiment further includes a second reception unit 604, a de-multiplexing unit 605 and a second transmission unit 606, where:

the second reception unit 604 is configured to receive a signal resulting from multiplexing, which is transmitted over the ODN;

the de-multiplexing unit 605 is configured to de-multiplex the signal received by the second reception unit 604 to retrieve a signal transmitted from the OLT to the ONU and signals transmitted respectively from the BBU to the different RRUs; and the second transmission unit 606 is configured to transmit the signal retrieved by the de-multiplexing unit 605 through de-multiplexing, which is transmitted from the OLT to the ONU, to the ONU, and the signals retrieved through de-multiplexing, which are transmitted respectively from the BBU to the different RRUs, to the corresponding RRU.

Figure 7:
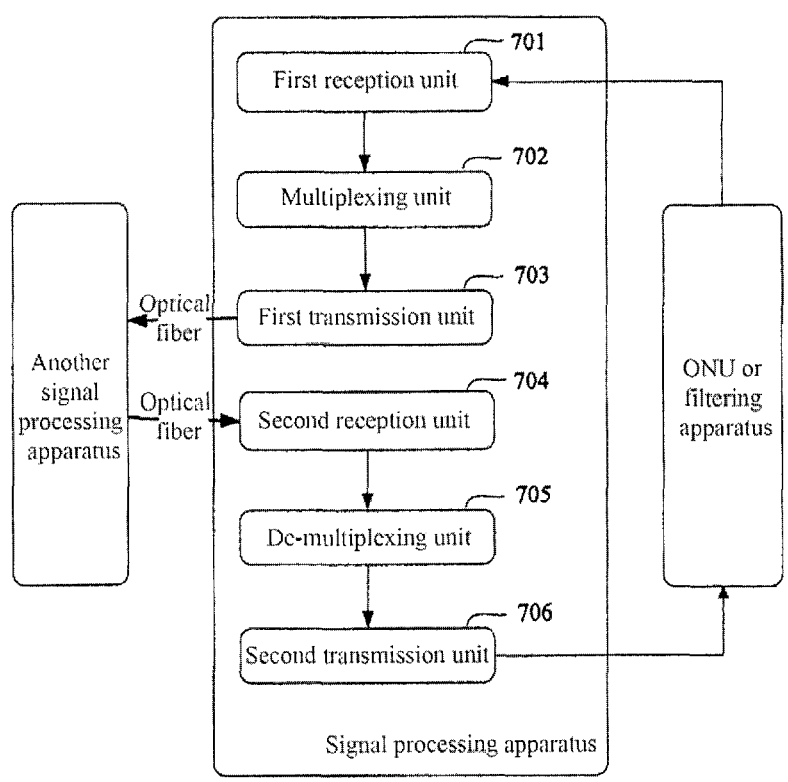
FIG. 7 is a schematic diagram of the structure of the third signal processing apparatus according to an embodiment of the invention.

Referring to FIG. 7, an embodiment of the invention further provides another signal processing apparatus including:

a first reception unit 701, a multiplexing unit 702 and a first transmission unit 703, where:

the first reception unit 701 is configured to receive a signal transmitted from an Optical Network Unit (ONU) to an Optical Line Terminal (OLT) and a signal transmitted from a filtering apparatus connected therewith;

the multiplexing unit 702 is configured to multiplex the signals received respectively by the first reception unit 701; and the first transmission unit 703 is configured to transmit a signal resulting from multiplexing by the multiplexing unit 702 over an ODN.

The signal processing apparatus according to the present embodiment further includes a second reception unit 704, a de-multiplexing unit 705 and a second transmission unit 706, where:

the second reception unit 704 is configured to receive a signal resulting from multiplexing, which is transmitted over the ODN;

the de-multiplexing unit 705 is configured to de-multiplex the signal received by the second reception unit 704 to retrieve a signal transmitted from the OLT to the ONU and signals transmitted from the BBU to respective RRUs; and the second transmission unit 706 is configured to transmit the signal retrieved through de-multiplexing by the de-multiplexing unit 705, which is transmitted from the OLT to the ONU, to the ONU, and the signals retrieved through de-multiplexing, which are transmitted from the BBU to the respective RRUs, to the filtering apparatus connected therewith.

Figure 8:
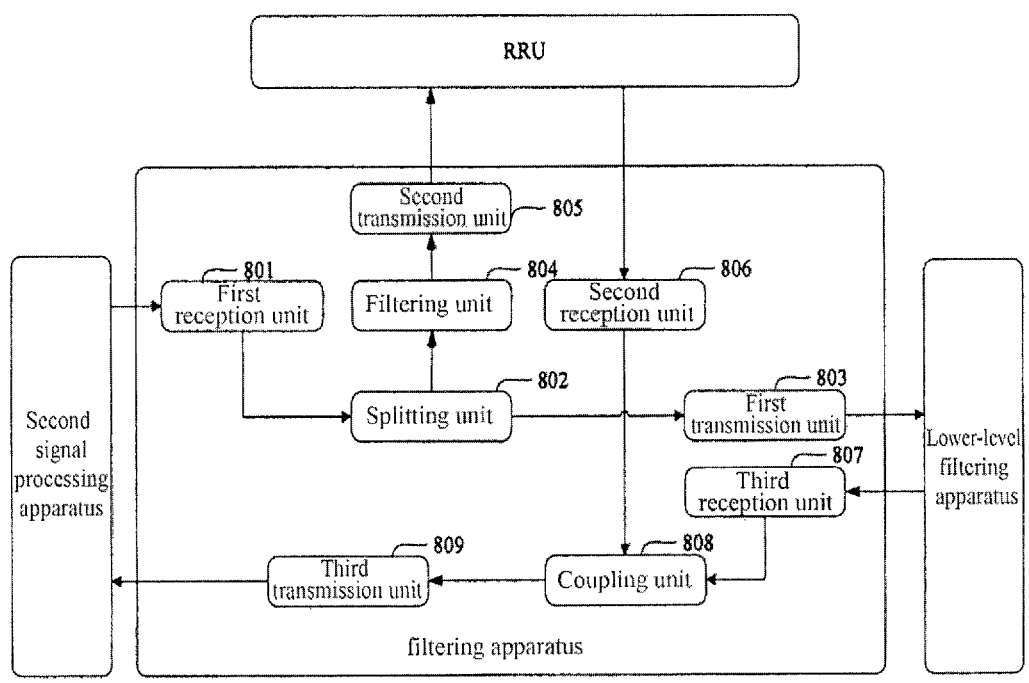
FIG. 8 is a schematic diagram of the structure of the filtering apparatus according to an embodiment of the invention.

Referring to FIG. 8, an embodiment of the invention further provides a filtering apparatus including a first reception unit 801, a splitting unit 802, a first transmission unit 803, a filtering unit 804 and a second transmission unit 805, where:

the first reception unit 801 is configured to receive a signal transmitted from the upper level of the filtering apparatus;

the splitting unit 802 is configured to split the signal received by the first reception unit 801 into two branches of signals;

the first transmission unit 803 is configured to transmit one of the branches of signals resulting from splitting by the splitting unit 802 to the lower level of the filtering apparatus;

the filtering unit 804 is configured to filter the other branch of signal resulting from splitting by the splitting unit 802 to retrieve a signal required for an RRU connected with the filtering apparatus at the wavelength required for the RRU connected with the filtering apparatus; and the second transmission unit 805 is configured to transmit the signal retrieved through filtering by the filtering unit 804 to the RRU connected with the filtering apparatus.

The filtering apparatus according to the present embodiment further includes a second reception unit 806, a third reception unit 807, a coupling unit 808 and a third transmission unit 809, where:

the second reception unit 806 is configured to receive a signal transmitted from the RRU connected with the filtering apparatus;

the third reception unit 807 is configured to receive a signal transmitted from the lower level of the filtering apparatus;

the coupling unit 808 is configured to couple the signals received by the second reception unit and the third reception unit; and the third transmission unit 809 is configured to transmit a signal resulting from coupling by the coupling unit to the upper level of the filtering apparatus.

Figure 9:
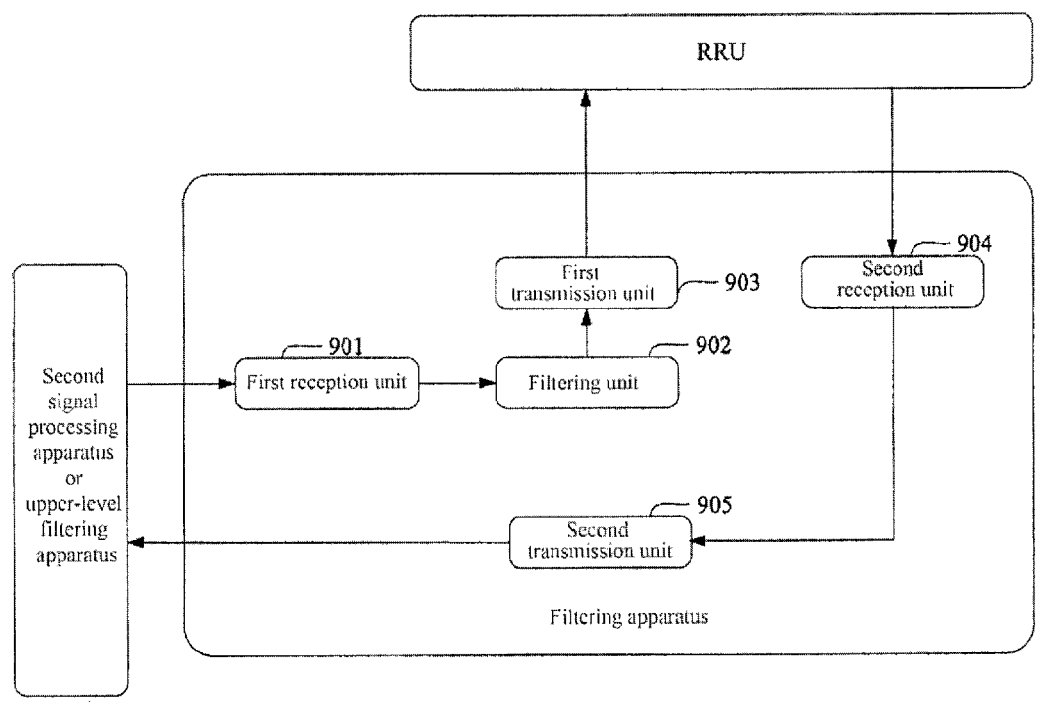
FIG. 9 is a schematic diagram of the structure of the filtering apparatus according to an embodiment of the invention.

Referring to FIG. 9, an embodiment of the invention further provides a filtering apparatus, which, belonging to the same inventive idea as the second filtering apparatus in FIG. 4, includes a first reception unit 901, a filtering unit 902 and a transmission unit 903, where the first reception unit 901 is configured to receive a signal transmitted from the upper level of the filtering apparatus, the filtering unit 902 is configured to filter the received signal to retrieve a signal required for an RRU connected with the filtering apparatus, and the first transmission unit 903 is configured to transmit the signal retrieved through filtering by the filtering unit to the RRU connected with the filtering apparatus.

The filtering apparatus further includes a second reception unit 904 and a second transmission unit 905, where the second reception unit 904 is configured to receive a signal transmitted from the RRU connected with the filtering apparatus, and the second transmission unit 905 is configured to transmit the signal transmitted from the RRU to the upper level of the filtering apparatus.

Figure 10:
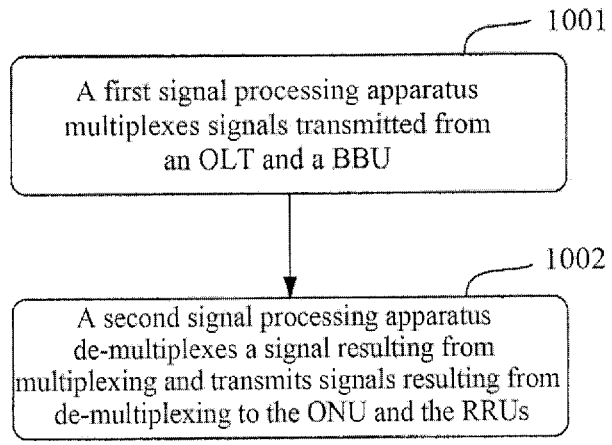
FIG. 10 is a schematic diagram of the first signal transmission method according to an embodiment of the invention.

An embodiment of the invention further provides a signal transmission method, and as illustrated in FIG. 10, this method belonging to the same inventive idea as the system illustrated in FIG. 3a generally includes the following operations 1001 to 1002.

Operation 1001: a first signal processing apparatus multiplexes signals transmitted from an OLT and a BBU.

In this operation, the first signal processing apparatus multiplexes the signal transmitted from the OLT to an ONU and the signals transmitted respectively from the BBU to different RRUs through wave division multiplexing.

Operation 1002: a second signal processing apparatus de-multiplexes a signal resulting from multiplexing and transmits the signals resulting from de-multiplexing to the ONU and the RRUs.

In this operation, the second signal processing apparatus de-multiplexes the signal transmitted from the first signal processing apparatus through wave division multiplexing.

In the operation 1002, the second signal processing apparatus retrieves through de-multiplexing the signal transmitted from the OLT to the ONU and the signals transmitted respectively from the BBU to the different RRUs and transmits the signal retrieved through de-multiplexing, which is transmitted from the OLT to the ONU, to the ONU, and the signals retrieved through de-multiplexing, which are transmitted respectively from the BBU to the different RRUs, to the corresponding RRUs.

Figure 11:
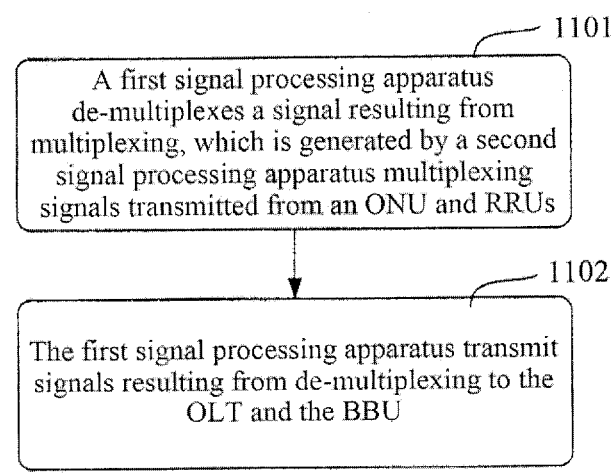
FIG. 11 is a schematic diagram of the second signal transmission method according to an embodiment of the invention.

An embodiment of the invention further provides another signal transmission method, and as illustrated in FIG. 11, the method belonging to the same inventive idea as the system illustrated in FIG. 3a generally includes the following operations 1101 to 1102.

Operation 1101: a first signal processing apparatus de-multiplexes a signal resulting from multiplexing, which is generated by a second signal processing apparatus multiplexing signals transmitted from an ONU and RRUs.

In this operation, the second signal processing apparatus multiplexes a signal transmitted from the ONU to an OLT and signals transmitted from the RRUs to a BBU through wave division multiplexing, and the first signal processing apparatus de-multiplexes the signal transmitted from the second signal processing apparatus through wave division multiplexing.

Operation 1102: the first signal processing apparatus transmit the signals resulting from de-multiplexing to the OLT and the BBU.

In the operation 1102, the first signal processing apparatus de-multiplexes the signal resulting from multiplexing to retrieve the signal from the ONU to the OLT and the signals transmitted from the RRUs to the BBU and transmits the signal retrieved through de-multiplexing, which is transmitted from the ONU to the OLT, to the OLT, and the signals retrieved through de-multiplexing, which are transmitted from the different RRUs to the BBU, to the BBU.

Figure 12:
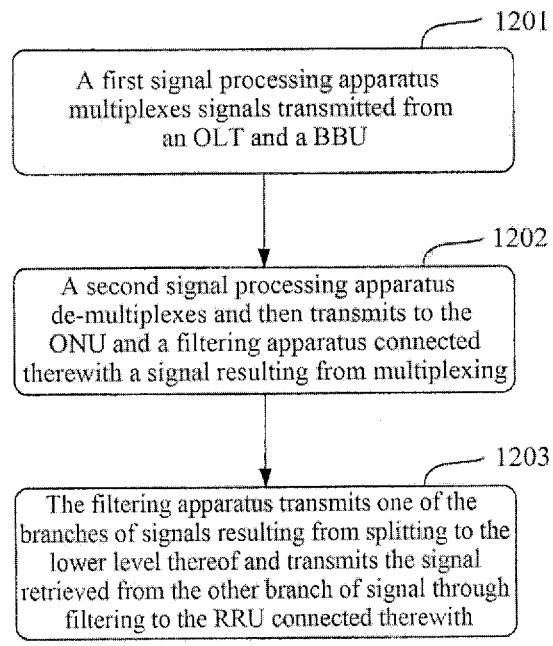
FIG. 12 is a schematic diagram of the third signal transmission method according to an embodiment of the invention.

An embodiment of the invention further provides a signal transmission method, and as illustrated in FIG. 12, this method belonging to the same inventive idea as the system illustrated in FIG. 4 generally includes the following operations 1201 to 1203.

Operation 1201: a first signal processing apparatus multiplexes signals transmitted from an OLT and a BBU.

In this operation, the first signal processing apparatus multiplexes the signal transmitted from the OLT to an ONU and the signals transmitted respectively from the BBU to different RRUs through wave division multiplexing.

Operation 1202: a second signal processing apparatus de-multiplexes and then transmits to the ONU and a filtering apparatus connected therewith a signal resulting from multiplexing.

Particularly, there is a terminal in filtering apparatuses connected in cascade, which is connected with the second signal processing apparatus, the second signal processing apparatus presents a hierarchical relationship with at least one filtering apparatus sequentially in an order that they are connected, and each of the filtering apparatuses is connected with an RRU.

In this operation, the second signal processing apparatus de-multiplexes the signal transmitted from the first signal processing apparatus through wave division multiplexing.

In the operation 1202, the second signal processing apparatus de-multiplexes the signal resulting from multiplexing to retrieve the signal transmitted from the OLT to the ONU and the signals transmitted from the BBU to the RRUs and transmits the signal retrieved through de-multiplexing, which is transmitted from the OLT to the ONU, to the ONU, and the signals retrieved through de-multiplexing, which are transmitted from the BBU to the RRUs, to the filtering apparatus connected therewith.

In the operation 1203, the filtering apparatus splits a signal transmitted from the upper level thereof into two branches of signals, transmits one of the branches of signals resulting from splitting to the lower level thereof, filters the other branch of signal resulting from splitting to retrieve a signal required for the RRU connected therewith and transmits the signal retrieved through filtering to the RRU connected therewith.

Figure 13:
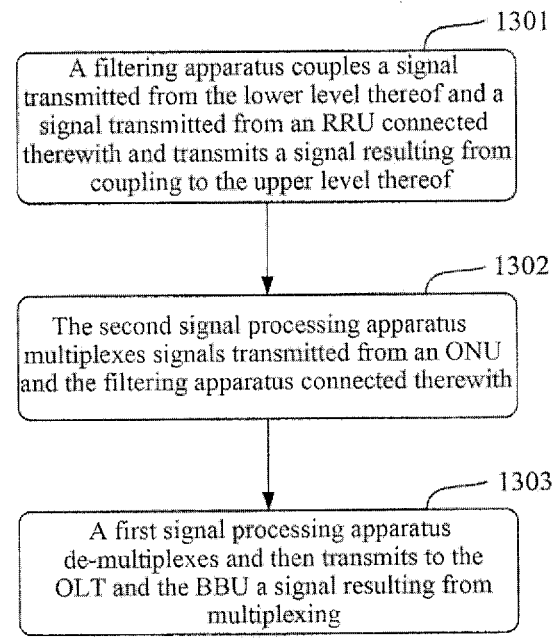
FIG. 13 is a schematic diagram of the fourth signal transmission method according to an embodiment of the invention.

An embodiment of the invention further provides another signal transmission method, and as illustrated in FIG. 13, this method belonging to the same inventive idea as the system illustrated in FIG. 4 generally includes the following operations 1301 to 1303.

Operation 1301: a filtering apparatus couples a signal transmitted from the lower level thereof and a signal transmitted from an RRU connected therewith and transmits a signal resulting from coupling to the upper level thereof.

Particularly, there is a terminal in filtering apparatuses connected in cascade, which is connected with a second signal processing apparatus, the second signal processing apparatus presents a hierarchical relationship with at least one filtering apparatus sequentially in an order that they are connected, and each of the filtering apparatuses is connected with an RRU.

Operation 1302: the second signal processing apparatus multiplexes signals transmitted from an ONU and the filtering apparatus connected therewith.

In this operation, the second signal processing apparatus multiplexes the signal transmitted from the ONU to an OLT and signals transmitted from the different RRUs to a BBU through wave division multiplexing.

In the operation 1303, a first signal processing apparatus de-multiplexes and then transmits to the OLT and the BBU a signal resulting from multiplexing.

In this operation, the first signal processing apparatus de-multiplexes the signal transmitted from the second signal processing apparatus through wave division multiplexing.

In the operation 1303, the first signal processing apparatus de-multiplexes the signal resulting from multiplexing to retrieve the signal transmitted from the ONU to the OLT and the signals transmitted from the different RRUs to the BBU and transmits the signal retrieved through de-multiplexing, which is transmitted from the ONU to the OLT, to the OLT, and the signals retrieved through de-multiplexing, which are transmitted from the different RRUs to the BBU, to the BBU.

Figure 14:
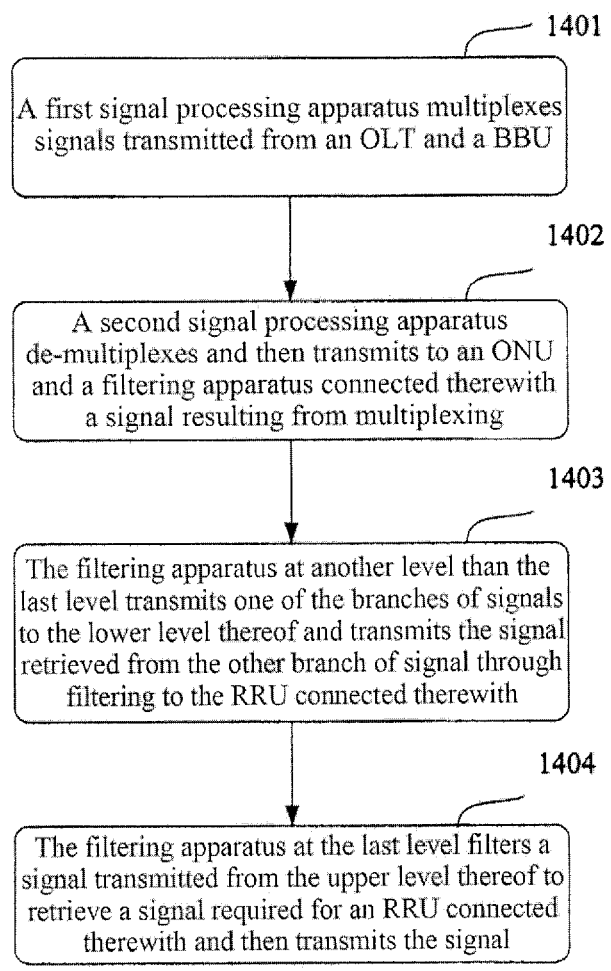
FIG. 14 is a schematic diagram of the fifth signal transmission method according to an embodiment of the invention.

An embodiment of the invention further provides a signal transmission method, and as illustrated in FIG. 14, this method belonging to the same inventive idea as the signal transmission system in the second embodiment including the filtering apparatus at another level than the last level and the filtering apparatus at the last level in cascade generally includes the following operations 1401 to 1404.

Operation 1401: a first signal processing apparatus multiplexes signals transmitted from an OLT and a BBU.

Operation 1402: a second signal processing apparatus de-multiplexes and then transmits to an ONU and a filtering apparatus connected therewith a signal resulting from multiplexing.

Operation 1403: the filtering apparatus at another level than the last level in cascade splits a signal transmitted from the upper level thereof into two branches of signals, transmits one of the branches of signals resulting from splitting to the lower level thereof, filters the other branch of signal resulting from splitting to retrieve a signal required for an RRU connected therewith and transmits the signal retrieved through filtering to the RRU connected therewith.

Operation 1404: the filtering apparatus at the last level in cascade filters a signal transmitted from the upper level thereof to retrieve a signal required for an RRU connected therewith and transmits the signal retrieved through filtering to the RRU connected therewith.

Figure 15:
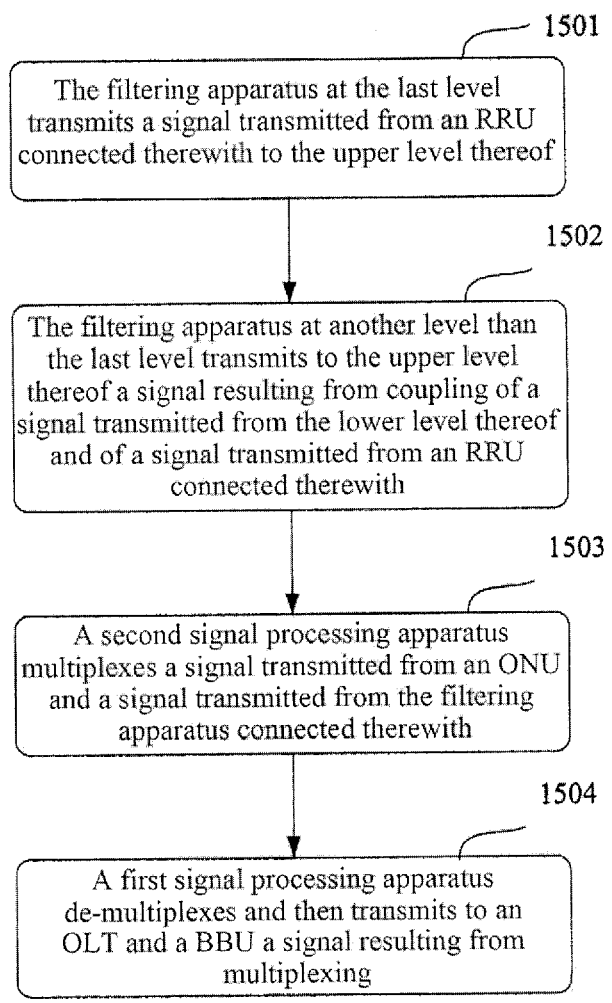
FIG. 15 is a schematic diagram of the sixth signal transmission method according to an embodiment of the invention.

An embodiment of the invention further provides a signal transmission method, and as illustrated in FIG. 15, this method belonging to the same inventive idea as the signal transmission system in the second embodiment including the filtering apparatus at another level than the last level and the filtering apparatus at the last level in cascade generally includes the following operations 1501 to 1504.

Operation 1501: the filtering apparatus at the last level in cascade transmits a signal transmitted from an RRU connected therewith to the upper level thereof.

Operation 1502: the filtering apparatus at another level than the last level in cascade couples a signal transmitted from the lower level thereof and a signal transmitted from an RRU connected therewith and transmits a signal resulting from coupling to the upper level thereof.

Operation 1503: a second signal processing apparatus multiplexes a signal transmitted from an ONU and a signal transmitted from the filtering apparatus connected therewith.

Operation 1504: a first signal processing apparatus de-multiplexes and then transmits to an OLT and a BBU a signal resulting from multiplexing.

Evidently those skilled in the art can make various modifications and variations to the invention without departing from the scope of the invention. Thus the invention is also intended to encompass these modifications and variations thereto as long as the modifications and variations come into the scope of the claims appended to the invention and their equivalents.

The invention claimed is:

1. A signal transmission system, comprising an Optical Distribution Network, ODN, an Optical Line Terminal, OLT, an Optical Network Unit, ONU, a Base Band Unit, BBU, Remote Radio Units, RRUs, a first signal processing apparatus and a second signal processing apparatus, wherein:

the first signal processing apparatus is configured to multiplex a signal transmitted from the OLT to the ONU and signals transmitted from the BBU to respective RRUs, to transmit the signal resulting from multiplexing to the second signal processing apparatus over the ODN, to de-multiplex the signal transmitted from the second signal processing apparatus over the ODN to retrieve a signal transmitted from the ONU to the OLT and signals transmitted from the respective RRUs to the BBU and to transmit the signal retrieved through de-multiplexing, which is transmitted from the ONU to the OLT, to the OLT, and the signals retrieved through de-multiplexing, which are transmitted from the respective RRUs to the BBU, to the BBU; and the second signal processing apparatus is configured to multiplex the signal transmitted from the ONU to the OLT and the signals transmitted from the respective RRUs to the BBU, to transmit the signal resulting from multiplexing to the first signal processing apparatus over the ODN, to de-multiplex the signal transmitted from the first signal processing apparatus over the ODN to retrieve the signal transmitted from the OLT to the ONU and signals transmitted from the BBU to the respective RRUs and to transmit the signal retrieved through de-multiplexing, which is transmitted from the OLT to the ONU, to the ONU, and the signals retrieved through de-multiplexing, which are transmitted from the BBU to the respective RRUs, to the respective RRUs respectively; and wherein the signal transmission system further comprising;

a filtering apparatus provided with one terminal connected with the second signal processing apparatus and the other terminal connected with one of the RRUs and configured to transmit a signal, transmitted from the second signal processing apparatus to the RRU connected therewith, to the RRU and a signal transmitted from the RRU connected therewith to the second signal processing apparatus.

2. The system of claim 1, wherein the signals transmitted from the BBU to the respective RRUs are signals at different wavelengths or signals at adjustable wavelengths or are converted by a wavelength converter into signals at different required wavelengths.

3. The system of claim 1, wherein signals are transmitted between the first signal processing apparatus and the second signal processing apparatus through a single bidirectional optical fiber.

4. The system of claim 1, wherein the BBU and the first signal processing apparatus are connected so that:

when an uplink signal and a downlink signal are transmitted at the same wavelength between the BBU and one of the RRUs, a port in the BBU via which the downlink signal is transmitted to the RRU and a port therein via which the uplink signal transmitted from the RRU is received are connected through a coupler with a port in the first signal processing apparatus via which the downlink signal transmitted from the BBU to the RRU is received and via which the uplink signal retrieved through de-multiplexing, which is transmitted from the RRU, is transmitted to the BBU; or when the uplink signal and the downlink signal are transmitted at different wavelengths between the BBU and one of the RRUs, the port in the BBU via which the downlink signal is transmitted to the RRU is connected with a port in the first signal processing apparatus via which the downlink signal transmitted from the BBU to the RRU is received, and the port in the BBU via which the uplink signal transmitted from the RRU is received is connected with a port in the first signal processing apparatus via which the uplink signal retrieved through de-multiplexing, which is transmitted from the RRU, is transmitted to the BBU.

5. A signal transmission system, comprising an Optical Line Terminal, OLT, an Optical Network Unit, ONU, a Base Band Unit, BBU, Remote Radio Unit, RRUs, a first signal processing apparatus, a second signal processing apparatus and at least two filtering apparatuses connected in cascade, wherein there is a terminal in the filtering apparatuses connected in cascade, which is connected with the second signal processing apparatus, the second signal processing apparatus presents a hierarchical relationship with at least one of the filtering apparatuses sequentially in an order that they are connected, and each of the filtering apparatuses is connected with one of the RRUs, wherein:

the first signal processing apparatus is configured to multiplex and then transmit to the second signal processing apparatus signals transmitted from the OLT and the BBU and to de-multiplex and then transmit to the OLT and the BBU a signal transmitted from the second signal processing apparatus;

the second signal processing apparatus is configured to multiplex and then transmit to the first signal processing apparatus signals transmitted from the ONU and the filtering apparatus connected therewith and to de-multiplex and then transmit to the ONU and the filtering apparatus connected therewith a signal transmitted from the first signal processing apparatus; and filtering apparatuses at another level than a last level in cascade each are configured to split a signal transmitted from an upper level thereof into two branches of signals, to transmit one of the branches of signals resulting from splitting to a lower level thereof, to filter the other branch of signal resulting from splitting to retrieve a signal required for the RRU connected therewith and to transmit the signal retrieved through filtering to the RRU connected therewith; and to couple a signal transmitted from the lower level thereof and a signal transmitted from the RRU connected therewith and to transmit a signal resulting from coupling to the upper level thereof.

6. The system of claim 5, further comprising an Optical Distribution Network, ODN, wherein:

the first signal processing apparatus is further configured to multiplex a signal transmitted from the OLT to the ONU and signals transmitted respectively from the BBU to the different RRUs, to transmit the signal resulting from multiplexing to the second signal processing apparatus over the ODN, to de-multiplex the signal transmitted from the second signal processing apparatus over the ODN to retrieve a signal transmitted from the ONU to the OLT and signals transmitted from the different RRUs to the BBU and to transmit the signal retrieved through de-multiplexing, which is transmitted from the ONU to the OLT, to the OLT, and the signals retrieved through de-multiplexing, which are transmitted from the different RRUs to the BBU, to the BBU; and the second signal processing apparatus is further configured to multiplex the signal transmitted from the ONU to the OLT and a signal transmitted from the filtering apparatus connected therewith, to transmit the signal resulting from multiplexing to the first signal processing apparatus over the ODN, to de-multiplex the signal transmitted from the first signal processing apparatus over the ODN to retrieve the signal transmitted from the OLT to the ONU and the signals transmitted from the BBU to the RRUs and to transmit the signal retrieved through de-multiplexing, which is transmitted from the OLT to the ONU, to the ONU, and the signals retrieved through de-multiplexing, which are transmitted from the BBU to the RRUs, to the filtering apparatus connected therewith.

7. The system of claim 5, wherein signals are transmitted between the first signal processing apparatus and the second signal processing apparatus through a single bidirectional optical fiber.

8. The system of claim 5, wherein the BBU and the first signal processing apparatus are connected so that:

when an uplink signal and a downlink signal are transmitted at the same wavelength between the BBU and one of the RRUs, a port in the BBU via which the downlink signal is transmitted to the RRU and a port therein via which the uplink signal transmitted from the RRU is received are connected through a coupler with a port in the first signal processing apparatus via which the downlink signal transmitted from the BBU to the RRU is received and via which the uplink signal retrieved through de-multiplexing, which is transmitted from the RRU, is transmitted to the BBU; or when the uplink signal and the downlink signal are transmitted at different wavelengths between the BBU and one of the RRUs, the port in the BBU via which the downlink signal is transmitted to the RRU is connected with a port in the first signal processing apparatus via which the downlink signal transmitted from the BBU to the RRU is received, and the port in the BBU via which the uplink signal transmitted from the RRU is received is connected with a port in the first signal processing apparatus via which the uplink signal retrieved through de-multiplexing, which is transmitted from the RRU, is transmitted to the BBU.

9. A signal processing apparatus, comprising:
a first reception unit configured to receive a signal transmitted from an Optical Network Unit, ONU, to an Optical Line Terminal, OLT, and a signal transmitted from a filtering apparatus connected therewith;
a multiplexing unit configured to multiplex the signals received respectively by the first reception unit;
a first transmission unit configured to transmit a signal resulting from multiplexing by the multiplexing unit;
a second reception unit configured to receive a signal resulting from multiplexing of a signal transmitted from the OLT to the ONU and of signals transmitted from a Base Band Unit, BBU, to respective Remote Radio Units, RRUs;
a de-multiplexing unit configured to de-multiplex the signal received by the second reception unit to retrieve the signal transmitted from the OLT to the ONU and the signals transmitted from the BBU to the respective RRUs; and
a second transmission unit configured to transmit the signal retrieved through de-multiplexing by the de-multiplexing unit, which is transmitted from the OLT to the ON U, to the ONU, and the signals retrieved through de-multiplexing, which are transmitted from the BBU to the respective RRUs, to the filtering apparatus connected therewith.

10. A filtering apparatus, comprising:
a first reception unit configured to receive a signal transmitted from an upper level of the filtering apparatus, wherein the signal comprises signals transmitted from a BBU to RRUs connected respectively with the filtering apparatus and lower levers of the filtering apparatus;
a splitting unit configured to split the signal received by the first reception unit into two branches of signals;
a first transmission unit configured to transmit one of the branches of signals resulting from splitting by the splitting unit to a lower level of the filtering apparatus, wherein the one of the branches of signals comprises signals transmitted from the BBU to RRUs connected respectively with the lower levels of the filtering apparatus;
a filtering unit configured to filter the other branch of signal resulting from splitting by the splitting unit to retrieve a signal required for a Remote Radio Unit, RRU, connected with the filtering apparatus; and
a second transmission unit configured to transmit the signal retrieved through filtering by the filtering unit to the RRU connected with the filtering apparatus.

11. The filtering apparatus of claim 10, further comprising:
a second reception unit configured to receive a signal transmitted from the RRU connected with the filtering apparatus;
a third reception unit configured to receive a signal transmitted from the lower level of the filtering apparatus;
a coupling unit configured to couple the signals received by the second reception unit and the third reception unit; and
a third transmission unit configured to transmit a signal resulting from coupling by the coupling unit to the upper level of the filtering apparatus.

12. A signal transmission method, applicable to a system comprising filtering apparatuses connected in cascade, wherein there is a terminal in the filtering apparatuses, which is connected with a second signal processing apparatus, the second signal processing apparatus presents a hierarchical relationship with at least one of the filtering apparatuses sequentially in an order that they are connected, and each of the filtering apparatuses is connected with a Remote Radio Unit, RRU, and
the method comprises:
multiplexing, by a first signal processing apparatus, signals transmitted from an Optical Line Terminal, OLT, and a Base Band Unit, BBU;
de-multiplexing and then transmitting by the second signal processing apparatus to an Optical Network Unit, ONU, and the filtering apparatus connected therewith a signal resulting from the multiplexing; and
splitting by a filtering apparatus at another level than a last level in cascade a signal transmitted from an upper level thereof into two branches of signals, transmitting one of the branches of signals resulting from splitting to a lower level thereof, filtering the other branch of signal resulting from splitting to retrieve a signal required for the RRU connected therewith and transmitting the signal retrieved through filtering to the RRU connected therewith.

13. The method of claim 12, wherein de-multiplexing and then transmitting by the second signal processing apparatus to the ONU and the filtering apparatus connected therewith the signal resulting from the multiplexing comprises:
de-multiplexing by the second signal processing apparatus the signal resulting from the multiplexing to retrieve a signal transmitted from the OLT to the ONU and signals transmitted from the BBU to the RRUs and transmitting the signal retrieved through de-multiplexing, which is transmitted from the OLT to the ONU, to the ONU, and the signals retrieved through de-multiplexing, which are transmitted from the BBU to the RRUs, to the filtering apparatus connected therewith.

14. A signal transmission method, applicable to a system comprising filtering apparatuses connected in cascade, wherein there is a terminal in the filtering apparatuses, which is connected with a second signal processing apparatus, the second signal processing apparatus presents a hierarchical relationship with at least one of the filtering apparatuses sequentially in an order that they are connected, and each of the filtering apparatuses is connected with a Remote Radio Unit, RRU, and
the method comprises:
coupling by each of filtering apparatuses at another level than a last level in cascade a signal transmitted from a lower level thereof and a signal transmitted from the RRU connected therewith and transmitting a signal resulting from the coupling to an upper level thereof;
multiplexing by the second signal processing apparatus a signal transmitted from an Optical Network Unit, ONU, and a signal transmitted from the filtering apparatus connected therewith; and
de-multiplexing and then transmitting by a first signal processing apparatus to an Optical Line Terminal, OLT, and a Base Band Unit, BBU, a signal resulting from the multiplexing.

15. The method of claim 14, wherein de-multiplexing and then transmitting by the first signal processing apparatus to the OLT and the BBU the signal resulting from the multiplexing comprises:
de-multiplexing by the first signal processing apparatus the signal resulting from the multiplexing to retrieve a signal transmitted from the ONU to the OLT and signals transmitted from the different RRUs to the BBU and transmitting the signal retrieved through de-multiplexing, which is transmitted from the ONU to the OLT, to the OLT, and the signals retrieved through de-multiplexing, which are transmitted from the different RRUs to the BBU, to the BBU.

16. A signal transmission system, comprising an Optical Line Terminal, OLT, an Optical Network Unit, ONU, a Base Band Unit, BBU, Remote Radio Units, RRUs, a first signal processing apparatus, a second signal processing apparatus and at least two filtering apparatuses connected in cascade, wherein there is a terminal in the filtering apparatuses connected in cascade, which is connected with the second signal processing apparatus, the second signal processing apparatus presents a hierarchical relationship with at least one of the filtering apparatuses sequentially in an order that they are connected, and each of the filtering apparatuses is connected with one of the RRUs, wherein:

the first signal processing apparatus is configured to multiplex and then transmit to the second signal processing apparatus signals transmitted from the OLT and the BBU and to de-multiplex and then transmit to the OLT and the BBU a signal transmitted from the second signal processing apparatus;

the second signal processing apparatus is configured to multiplex and then transmit to the first signal processing apparatus signals transmitted from the ONU and the filtering apparatus connected therewith and to de-multiplex and then transmit to the ONU and the filtering apparatus connected therewith a signal transmitted from the first signal processing apparatus;

a filtering apparatus at another level than a last level in cascade is configured to split a signal transmitted from an upper level thereof into two branches of signals, to transmit one of the branches of signals resulting from splitting to a lower level thereof, to filter the other branch of signal resulting from splitting to retrieve a signal required for the RRU connected therewith, to transmit the signal retrieved through filtering to the RRU connected therewith, to couple a signal transmitted from the lower level thereof and a signal transmitted from the RRU connected therewith and to transmit a signal resulting from coupling to the upper level thereof; and a filtering apparatus at a last level in cascade is configured to filter a signal transmitted from an upper level thereof to retrieve a signal required for the RRU connected therewith and to transmit the signal retrieved through filtering to the RRU connected therewith and a signal transmitted from the RRU connected therewith to the upper level thereof.

17. A signal transmission method, applicable to a system comprising filtering apparatuses connected in cascade, wherein there is a terminal in the filtering apparatuses, which is connected with a second signal processing apparatus, the second signal processing apparatus presents a hierarchical relationship with at least one of the filtering apparatuses sequentially in an order that they are connected, and each of the filtering apparatuses is connected with a Remote Radio Unit, RRU, and the method comprises:

multiplexing, by a first signal processing apparatus, signals transmitted from an Optical Line Terminal, OLT, and a Base Band Unit, BBU;

de-multiplexing and then transmitting by the second signal processing apparatus to an Optical Network Unit, ONU, and the filtering apparatus connected therewith a signal resulting from the multiplexing;

splitting by a filtering apparatus at another level than a last level in cascade a signal transmitted from an upper level thereof into two branches of signals, transmitting one of the branches of signals resulting from splitting to a lower level thereof, filtering the other branch of signal resulting from splitting to retrieve a signal required for the RRU connected therewith and transmitting the signal retrieved through filtering to the RRU connected therewith;

filtering by a filtering apparatus at the last level in cascade a signal transmitted from an upper level thereof to retrieve a signal required for the RRU connected therewith and transmitting the signal retrieved through filtering to the RRU connected therewith.

18. A signal transmission method, applicable to a system comprising filtering apparatuses connected in cascade, wherein there is a terminal in the filtering apparatuses, which is connected with a second signal processing apparatus, the second signal processing apparatus presents a hierarchical relationship with at least one of the filtering apparatuses sequentially in an order that they are connected, and each of the filtering apparatuses is connected with a Remote Radio Unit, RRU, and the method comprises:

transmitting by a filtering apparatus at a last level in cascade a signal transmitted from the RRU connected therewith, to an upper level thereof;

coupling by a filtering apparatus at another level than the last level in cascade a signal transmitted from a lower level thereof and a signal transmitted from the RRU connected therewith and transmitting a signal resulting from the coupling to an upper level thereof;

multiplexing by the second signal processing apparatus a signal transmitted from an Optical Network Unit, ONU, and a signal transmitted from the filtering apparatus connected therewith; and de-multiplexing and then transmitting by a first signal processing apparatus to an Optical Line Terminal, OLT, and a Base Band Unit, BBU a signal resulting from the multiplexing.

\* \* \* \* \*